United States Patent [19]

Mackal

[11] 4,087,189

[45] May 2, 1978

[54] CORD FASTENER

[76] Inventor: Glenn H. Mackal, 82 Chestnut Ridge Rd., Saddle River, N.J. 07458

[21] Appl. No.: 412,880

[22] Filed: Nov. 5, 1973

Related U.S. Application Data

[62] Division of Ser. No. 344,749, Mar. 26, 1973.

[51] Int. Cl.² .............................................. F16G 11/00
[52] U.S. Cl. .................................... 403/216; 403/285
[58] Field of Search .............. 403/216, 206, 285, 284, 403/283, 282; 24/115 A, 129 W, 115 R; 339/276, 97

[56]  References Cited
U.S. PATENT DOCUMENTS

| 461,868 | 10/1891 | Fleming | 403/285 |
| 3,226,471 | 12/1965 | Buchanan et al. | 403/285 X |

FOREIGN PATENT DOCUMENTS 1,199,676  6/1959  France .................................. 403/216

Primary Examiner—Wayne L. Shedd

[57] ABSTRACT

Improved cord fastening device, used for example, for securing the lanyard cord to the capsule-piercing lever of an inflation manifold for use with an inflatable article such as a life vest, life raft, and the like. The cord extends through a hole in the lever, the cord on opposite sides of the lever being gathered to lie parallel and being embraced and strongly gripped by a metal sleeve telescoped thereover.

3 Claims, 4 Drawing Figures

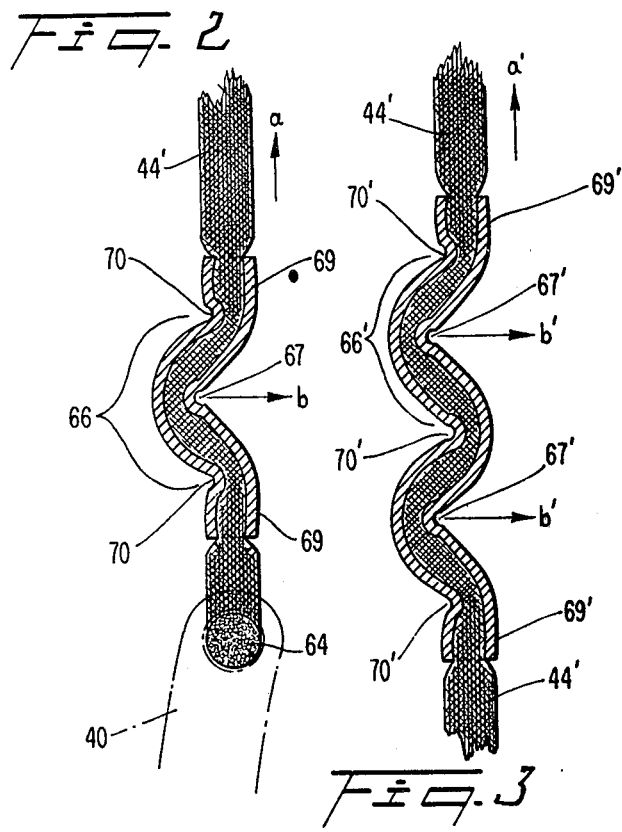

CORD FASTENER

This application is a division of application Ser. No. 344,749, filed Mar. 26, 1973.

This invention relates to a cord securing device used, for example, to secure a lanyard cord to an inflation manifold assembly.

Although in its broader aspects the invention is not limited thereto, the invention is illustrated herein in connection with its use with a $CO_2$ inflation manifold assembly for use with an inflatable article such as a life vest, life raft, and the like. In the described assembly, the plastic flange or base, adapted for being heat-sealed to the wall of an inflatable article, has a central passage therethrough into which there extends the sleeve-like body of a check valve, such body being sealed to the mounting flange and locked against relative rotation with respect thereto. The combination of valve body and mounting flange is sealed to the sleeve portion of an inflation manifold in which the valve body is mounted. Such general combination of mounting flange, valve body, and inflation manifold is shown, for example, in application Ser. No. 218,669, filed Jan. 18, 1972, of which the present inventor is a co-inventor.

It is among the objects of the present invention to provide an improved device for securing a cord such as a lanyard of an inflation manifold to the capsule-piercing lever of the manifold.

The above and further objects and novel features of the invention will more fully appear from the following description when the same is read in conjunction with the accompanying drawings. It is to be expressly understood, however, that the drawings are for the purpose of illustration only, and are not intended as a definition of the limits of the invention.

In the drawings, wherein like reference characters refer to the like parts throughout the several views:

FIG. 2 is a view in longitudinal section on an enlarged scale of the lanyard cord-securing device;

FIG. 3 is a view similar to FIG. 2 of a modified cord-securing device, and

Figure 1:
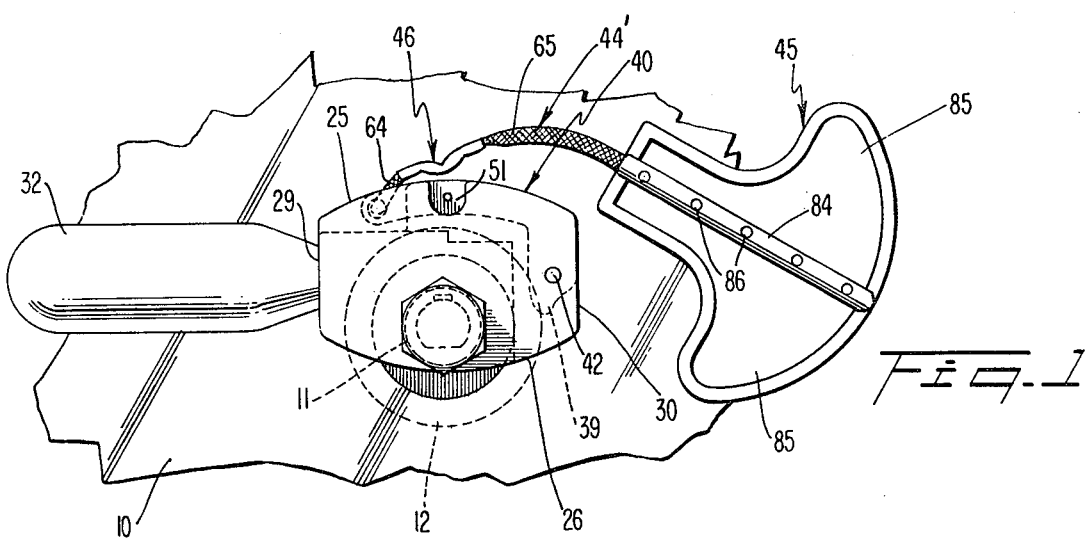
FIG. 1 is a view in elevation of a manifold according to the present invention, an inflatable body on which the manifold is mounted being shown fragmentarily.
Figure 4:
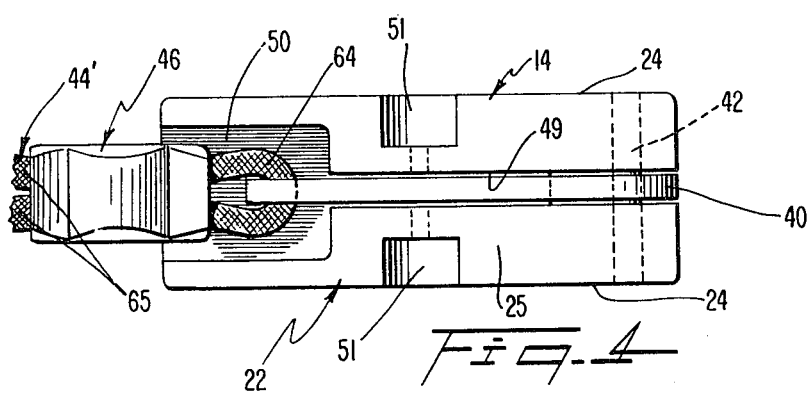

FIG. 4. is a view in plan of the inflation manifold of FIG. 1.

In FIG. 1 there is shown a manifold and check valve assembly sealingly mounted upon a panel 10 of an inflatable article. The sleeve-like main body 11 of the check valve passes through and is sealed to a mounting flange 12 made of elastomeric material which is heat-sealable to the panel 10 of the inflatable article. The sleeve-like body of the valve and its manner of connection and sealing to the mounting flange may be the same as those shown and described in the above-referred to application, Ser. No. 218,669.

The illustrative inflation manifold has a passage extending therethrough transverse to the broad extent of the manifold, the passage having a flat side on the bottom thereof as it is shown in FIG. 1. The sleeve-like body 11 of the valve, which has an external configuration complementary to the cross-section of the passage, extends through such passage and is sealingly held therein by a cap nut screwed onto the threaded outer end of the body 11, there being suitable washers interposed, on the one hand, between a flange adjacent the inner end of the body 11 and the body of the manifold, and, on the other hand, between the cap nut and the body of the manifold on the other side thereof.

The embodiment of manifold shown in the drawings has a body generally in the form of a thick disc having parallel front and rear sides, parallel longitudinally spaced ends 29, 30, and upper and lower surfaces 25, 26 respectively, of oppositely convex, part-circular cylindrical shape. At its left-hand end as it is shown in FIG. 1, the body of the manifold is provided with means for threadedly receiving the threaded neck of $CO_2$ cartridge 32 and sealing it to the gas-conducting chamber inwardly of the body 2 of the manifold. It is to be understood that the capsule 32 has a sealing disc of soft metal spanning its neck, such soft metal seal being adapted to be pierced when required, whereby to release the gas from the capsule so that it flows into the chamber in the manifold body through a passage therein and thence through an exit passage into the longitudinal bore in the valve body 11 through a radial passage therein.

The soft metal seal of the capsule 32 is pierced, when it is desired to inflate the inflatable article, by means including a cam lever in the form of a bell crank lever 40 having an elongated lever arm which lies generally horizontal (FIG. 1) when the lever is in retracted, inoperative position, and a generally vertical, shorter arm having a cam 39 on its lower end. The lever 40 is pivotally mounted upon a transverse pivot pin 42 which extends from one side of the manifold body to the other and spans a narrow, longitudinally extending lever-receiving slot which extends longitudinally of the body of the manifold at the top thereof and downwardly along the right-hand end of the manifold body.

Reciprocally and sealingly mounted in a circular cylindrical bore in the body 22 forming a prolongation of the chamber therein is a needle plunger, the enlarged outer end or head of which is in the form of a cam follower. The plunger is constantly urged to the right into engagement with the cam 39 by a coil compression spring which acts between the head of the plunger and an annular shoulder at the left-hand end of the chamber in body 22. Coaxial of the plunger and forming a part thereof is a capsule seal-piercing needle, the sharpened left-hand end of which is spaced from the seal at the end of the neck of the capsule 32 when the lever 40 is in its retracted, inoperative position, as shown in FIG. 1.

When it is desired to release the gas from the capsule 32 in order to inflate the inflatable article, the lever 40 is swung clockwise about its mounting pivot shaft 42 until the high point of the cam 39 has passed through the position in which it engages the high point of the cam follower on the end of the head of the plunger 41. This causes the piercing needle first to be thrust to the left against the opposition of the spring 48 sufficiently to pierce the seal in the neck of the capsule 32, the spring thereafter thrusting the plunger to the right as the high point of its cam follower end travels downwardly on the cam 39 on lever 40, thereby to open the hole made in the soft metal seal in the neck of the capsule 32 by the needle. Such swinging of the lever 40 is accomplished by pulling a handle 45 on a lanyard cord generally designated 44, which is secured to the outer end of the longer arm of the lever 40 by a sleeve-like means 46 in the direction to the right in FIG. 1.

Provision is made for securing the lever 40 in the position of FIG. 1 by a wire seal (not shown) of small gauge which extends through a hole in lever 40 and passages in body 22 extending inwardly from oppositely disposed aligned recesses 51 therein. Such seal prevents the unwanted movement of the lever 40 in a seal-piercing direction, but may readily be broken by a deliberate, fairly strong pull exerted upon the handle 45 of the lanyard. The body 22 of the manifold is also provided at its upper left-hand corner (FIG. 1) with a broader recess 50 into which the outer free end of the lever 40 protrudes, recess 50 receiving the inner end of the cord fastener 46, thereby allowing such fastener to overlie the portion of the body of the capsule 32 adjacent its neck so that it, the lanyard cord, and the handle 45 are generally out of the way until needed.

The means 46 shown in FIG. 1 for fastening the lanyard cord 44 to the outer end of lever 40 is particularly shown in FIG. 2. The bight of a loop 64 in the lanyard cord 44' extends through a hole in the outer end of the longer arm of lever 40, the two parallel portions 65 of the cord passing through the fastener 46, which is in the form of a flattened sleeve. Such sleeve is simultaneously crimped transversely at a longitudinally central position 67 and two longitudinally spaced outer zones 69, the sleeve also being simultaneously deformed into a broad V-shaped portion 66. This may be done, for example, by engaging the sleeve by two longitudinally spaced, transverse dies which engage the sleeve near its outer ends on its left-hand surface (FIG. 2) to form indentations 70 in outer zones 69 of the sleeve, while a movable transverse die engages the central portion of the sleeve at its right-hand side to form indentation 67, simultaneously thrusting such central portion of the sleeve as a whole to the left.

As a result of such deformation, not only is the sleeve tightened very forcibly upon the runs 65 of the cord 44' at the zones 67 and 70, but upon the imposition of a pull on a cord 44' in the direction $a$ in FIG. 2, the force $b$ with which the central deformed zone 67 of the sleeve engages the runs of the cord is increased. Thus the sleeve fastener 46 retains the cord 44' so securely that there is no possibility of slippage of the cord in the fastener under any service condition, no matter how severe.

The cord fastener of FIG. 3 is similar to that of FIG. 2 but has a longer sleeve with three longitudinally spaced concave-convex zones. Parts in FIG. 3 which are similar to those of FIG. 2 are designated by the same reference characters with an added prime (').

Although the invention is illustrated and described with reference to a plurality of preferred embodiments thereof, it is to be expressly understood that it is in no way limited to the disclosure of such preferred embodiments, but is capable of numerous modifications within the scope of the appended claims.

What is claimed is:

1. The combination comprising two runs of cord lying side-by-side and a fastener for retaining the runs from longitudinal slippage with respect to each other, the fastener comprising an elongated flattened sleeve embracing the two side-by-side runs of cord, the sleeve being bent into a longitudinally V-shaped zone intermediate its length, the sleeve being made of ductile metal and being transversely indented on its broad inner side at the apex of the V-shaped zone so as to deform and indent the two runs of cord engaged by such indentation.

2. The combination according to claim 1, comprising oppositely directed aligned end zones of the sleeve immediately beyond the respective ends of the V-shaped zone, each of said end zone of the sleeve being transversely indented on the broad side thereof opposite the indentation on the inner side of the apex of the V-shaped zone, the last-named indentations deforming and indenting the two runs of cord engaged thereby.

3. The combination according to claim 1, comprising generally oppositely directed further zones of the sleeve immediately beyond the respective ends of the V-shaped zone, each of said further zones of the sleeve being transversely indented on the broad side thereof opposite the indentation on the inner side of the apex of the V-shaped zone, the last-named indentations deforming and indenting the two runs of cord engaged thereby.

* * * * *